United States Patent [19]

Hamada et al.

[11] Patent Number: 5,097,110
[45] Date of Patent: Mar. 17, 1992

[54] REFLECTING MIRROR FOR A LASER BEAM AND LASER BEAM WELDING APPARATUS, INCLUDING THE SAME LASER BEAM REFLECTING MIRROR

[75] Inventors: Shoichi Hamada; Isao Shirasu; Tadashi Nagashima; Takashi Akaba; Shuhei Kuri; Takuya Kidera, all of Kobe; Yasumi Nagura, Takasago; Seiichi Kawaguchi, Takasago; Takashi Ishide, Takasago; Yoshio Hashimoto, Takasago, all of Japan

[73] Assignee: Mitsubishi Jukogyo Kabushiki Kaisha, Tokyo, Japan

[21] Appl. No.: 558,238

[22] Filed: Jul. 26, 1990

[30] Foreign Application Priority Data

Aug. 7, 1989 [JP] Japan ................. 1-204521

[51] Int. Cl.$^5$ ............................................. B23K 26/00
[52] U.S. Cl. ........................... 219/121.63; 359/360; 376/260
[58] Field of Search ................. 219/121.63, 121.64, 219/121.74; 376/260; 350/1.7, 641, 642

[56] References Cited

U.S. PATENT DOCUMENTS

| | | | |
|---|---|---|---|
| 2,854,349 | 9/1958 | Dreyfus et al. | 350/1.7 X |
| 2,907,672 | 10/1959 | Irland et al. | 350/1.7 X |
| 3,176,679 | 4/1965 | Langley | 350/1.7 X |
| 3,781,077 | 12/1973 | Groth | 350/1.7 |
| 4,322,130 | 3/1982 | Ito et al. | 350/1.7 X |
| 4,822,120 | 4/1989 | Fan et al. | 350/1.7 |
| 4,839,495 | 6/1989 | Kitera et al. | 219/121.63 |
| 4,983,796 | 1/1991 | Griffaton | 219/121.63 |

OTHER PUBLICATIONS

IR Series Infraed Laser Optics, PTR Optics Corp.

Primary Examiner—C. L. Albritton
Attorney, Agent, or Firm—Wenderoth, Lind & Ponack

[57] ABSTRACT

The known reflecting mirror for a laser beam conisting of a mirror base member and a high-reflectivity metal coating layer formed on the mirror base member for reflecting a laser beam, is improved so as to maintain a high mirror reflectivity without necessitating a cooling facility. The improvements reside in that a coating layer having a small diffusion coefficient is provided on the back surface side of the high-reflectivity metal coating layer, and/or in that at least one layer of dielectric coating layer or layers are provided on the surface of the high reflectivity metal coating layer. Also, an improved laser beam welding apparatus for an inner circumferential surface of a tube is provided by employing the aforementioned improved reflection mirror as a reflecting mirror in an optical condensing system included in a laser beam welding apparatus for an inner circumferential surface of a tube, which apparatus comprises a flexible tube including an optical fiber extended therethrough for transmitting a welding laser beam, said flexible tube being insertable into a work tube, a position detector for detecting a relative position of the flexible tube with respect to the work tube and fixing means of internally expansible type for fixing the flexible tube within the work tube, respectively provided at the front end portion of the flexible tube, a rotary cylinder rotatably supported from the flexible tube, guide support means mounted to the rotary cylinder in a relatively rotatable manner and being able to be held in contact with the inner wall surface of the work tube for holding the rotary cylinder concentrically with the work tube, rotary drive means having its output shaft disposed coaxially with said rotary cylinder for rotationally driving the rotary cylinder, an optical condensing system disposed within said rotary cylinder for leading the welding laser beam emanating from the front end of the optical fiber to the inner wall surface of the work tube in a condensed state, gas scavenging means for discharging metal vapor produced upon welding of the work tube, and gas cooling means for cooling the optical condensing system.

18 Claims, 8 Drawing Sheets

REFLECTING MIRROR FOR A LASER BEAM AND LASER BEAM WELDING APPARATUS, INCLUDING THE SAME LASER BEAM REFLECTING MIRROR

BACKGROUND OF THE INVENTION

The present invention relates to a reflecting mirror for diverting a laser beam of high energy transmitted from a laser oscillator and also relates to a laser beam welding apparatus including such reflecting mirror for welding a repair sleeve snugly inserted into a thin tube, such as a heat transfer tube in a heat-exchanger, to the tube, to thereby preventing leakage through a damaged area generated in the thin tube and internally covered by the repair sleeve.

Several decades have passed since a first nuclear reactor was placed to commercial use for power generation.

Figure 28:
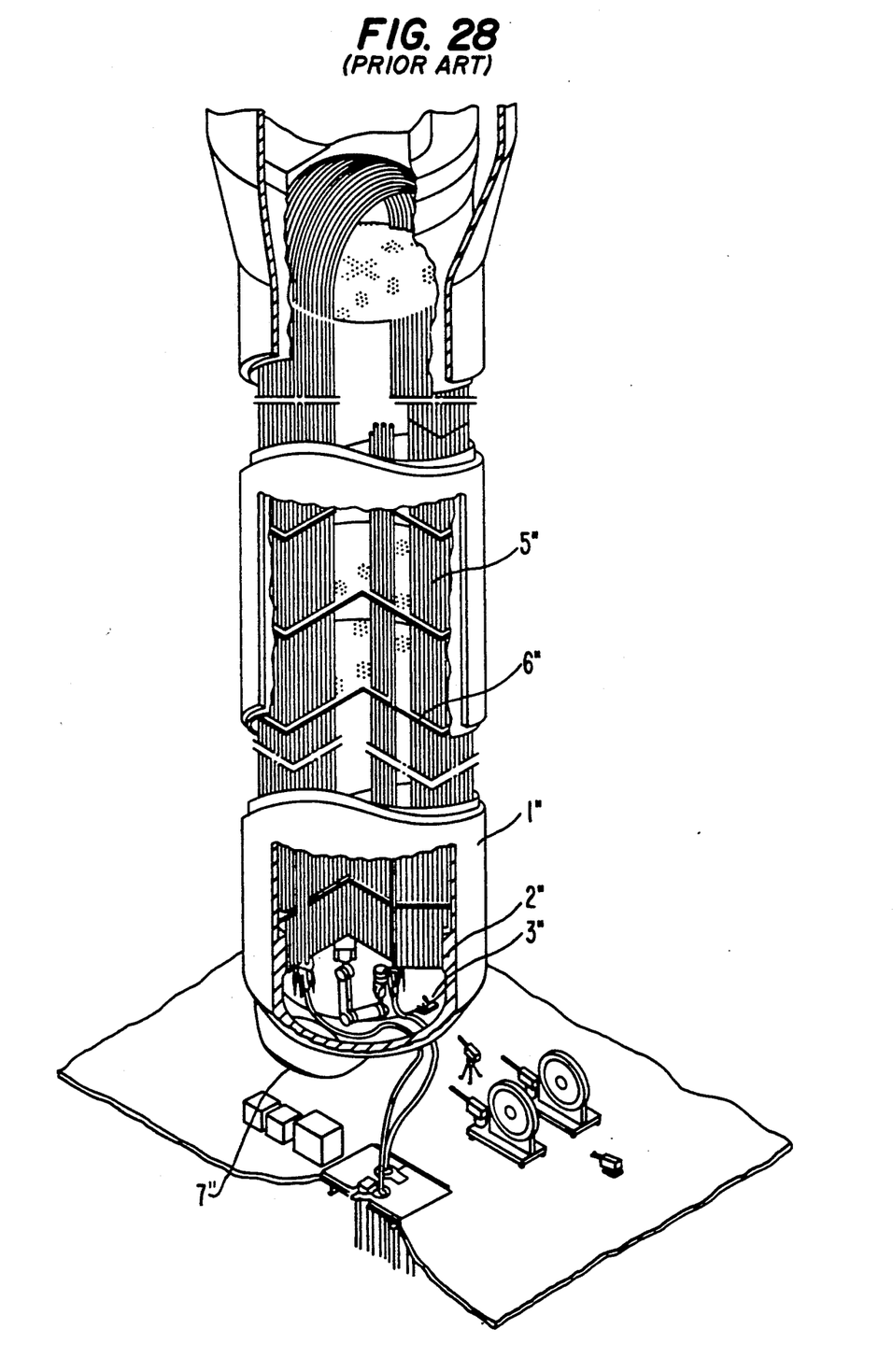
FIG. 28 is a perspective view partly cut away of a conventional steam generator.

Now, as one of the most important associated installations in a nuclear power generation plant, steam generators are well known for generating steam to drive a turbine. Generally, a steam generator used in a pressurized water reactor is a multitube cylindrical heat-exchanger in which secondary water is vaporized by the heat-exchanger with primary water heated in the nuclear reactor. A general internal structure of such steam generator is shown in FIG. 28, in which a lower end portion of a vertical cylindrical shell 1" is partitioned by a horizontal tube plate 2" to define a hemispherical water chamber 3". The water chamber is further divided into two halves by a vertical partition plate not shown, and end ports of a large number of thin U-shaped heat transfer tubes 5" extend through the tube plate 2" and open respectively into the two portions of the 3". These thin heat transfer tubes 5" are supported within the cylindrical shell 1" via a plurality of support plates 6". High-temperature primary water or primary reactor coolant sent from a nuclear reactor (not shown) enters through an inlet nozzle 7" communicating with one of the portions of the water chambers 3" and flows through the heat transfer tubes 5" into the other of the portions of the water chamber 3", and then it flows back to the nuclear reactor through an outlet nozzle (not shown) which communicates with the latter portion of the water chamber 3". In passing through these thin heat transfer tubes 5", heat-exchange is effected between the primary water and secondary water which is fed into the cylindrical shell 1" through a water feed nozzle (not shown) provided on a side surface portion of the cylindrical shell 1" for generating steam to be used for driving a turbine. The secondary water transformed into high-temperature steam in the above-described manner is adapted to be fed to a steam turbine (not shown) from the upper portion of the cylindrical shell 1".

Generally, in designing installations used in nuclear systems, materials used therein are carefully selected, and in addition, quality control for the materials is also very strict. In the above-described steam generator also, during its normal operation during various periodic inspections and any related repair operations, and in the event that any damage or defect should be detected in one of the thin heat transfer tubes, the following out-of-service treatment may be effected. That is, in order to prevent the high-pressure primary water from leaking out of the damaged heat transfer tube, seal plugs are pressed into the opposite end of the tube, and thereafter seal welding is effected along the peripheries of the plugs. In this manner, the damaged tube is placed in an out-of-service state.

With such out-of-service treatment with seal plugs, however, a decrease in the heat-exchange capacity of the steam generator cannot be avoided. If the number of the plugged heat transfer tubes increases, the decrease in the capacity cannot be ignored.

Considering such disadvantages, a repair method using repair sleeves was proposed and has been used. The repair sleeve is inserted into a damaged heat transfer tube and used to patch a damaged region of the tube from inside.

According to this method, it is necessary to use fairly high-temperature brazing material when the material of the heat transfer tube is special as in a nuclear steam generator. In addition to difficulty in working, in most cases metallurgical structures of the heat transfer tube and the repair sleeve are effected by this method. Furthermore, depending upon the dimensions of the water chamber where the repair work is to be conducted, it is impossible to insert a long repair sleeve into the heat transfer tubes positioned at the periphery of the chamber.

To facilitate the operation of fixing the repair sleeve on an inner surface of the damaged tube, another method has been proposed in lieu of the brazing operation mentioned above. The improved method is to mechanically or hydraulically expand a repair sleeve provided with one or more annular protrusions on an outer surface thereof. However, there is a restriction in the application of this improved method in cases where a heat transfer tube to be repaired has already been expanded and subjected to work-hardening. In such cases, because of the necessity of making the protrusions of the repair sleeve bite into the inner circumferential surface of the heat transfer tube, the material of the repair sleeve must be sufficiently harder than the material of the heat transfer tube in addition to being expansible.

For such situations, a laser beam welding apparatus was invented which is of a compact size and is applicable to welding a repair sleeve in a heat transfer tube of very small size. Patent applications on the laser beam welding apparatus were filed in various countries. Now, the U.S. patent application has been allowed and the U.S. Pat. No. 4,839,495 has issued for this invention. In the laser beam welding apparatus, a reflecting mirror of metal is used but the cooling of it is very restricted because of the compactness needed.

Figure 9:
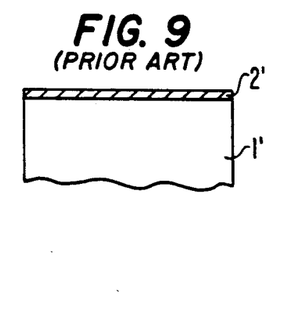
FIGS. 9 and 10 are cross-section views respectively showing reflecting mirrors in the prior art.
Figure 10:
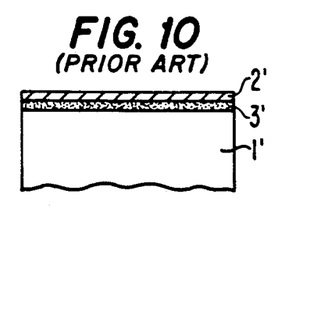

In such a laser welding machine, a high power laser such as a carbon dioxide gas laser or a YAG laser, has been employed. As reflecting mirrors in the prior art apparatus, mirrors produced by forming a gold coating layer 2' having a high reflectivity on a mirror base member 1' made of copper as shown in FIG. 9, or mirrors formed by providing a nickel coating layer 3' on a mirror base member to facilitate optical polishing and then forming a gold coating layer 2' thereon as shown in FIG. 10, have been generally used.

In the heretofore known reflecting mirror as described above, when it is used under high-temperature environmental conditions, or when a laser is used under a high power condition for a long period, the temperature of the reflecting mirror would rise due to absorption of several percent of the laser beam energy.

Figure 11:
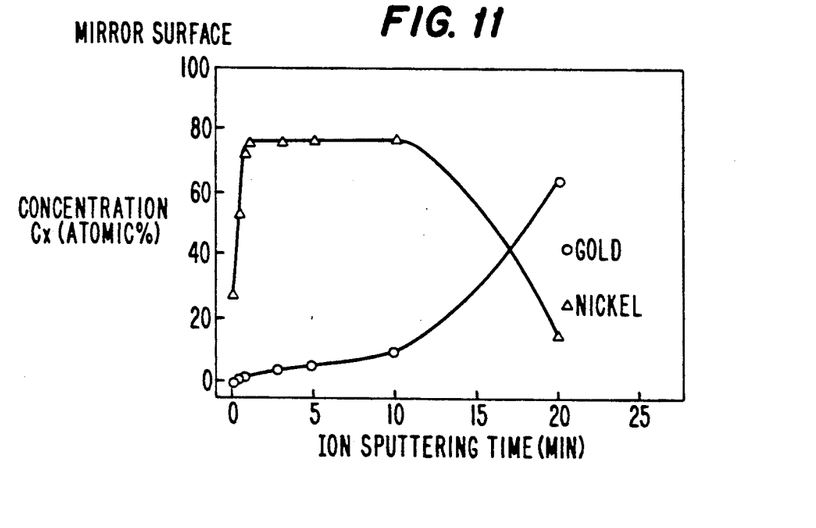
FIG. 11 is a diagram showing results of Auger analysis for a mirror coating portion after use of the reflecting mirror in the prior art shown in FIG. 10.
Figure 12:
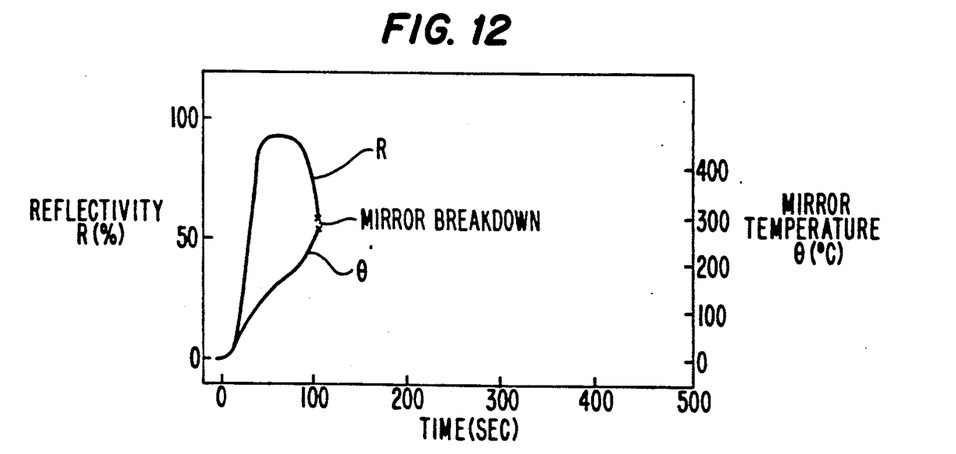
FIG. 12 is a diagram showing the relations between a laser beam irradiation time and reflectivity, mirror temperature of the reflecting mirror in the prior art shown in FIG. 10.

When such reflecting mirror is used without carrying out sufficient cooling such as water cooling, the mirror temperature would rise, and mutual diffusion of metals may occur between the gold coating layer and the mirror base member or between the gold coating layer and the nickel coating layer. FIG. 11 is an illustration of the state of mutual diffusion between the gold coating layer and the nickel coating layer after the reflecting mirror shown in FIG. 10 has been used for a long time under a high power condition on the basis of results of Auger analysis along the direction of depth from the mirror surface, and it is seen from this figure that nickel can diffuse up to the mirror use under surface. If such conditions continues, a reflectivity of the reflecting mirror may be lowered, and eventually breakdown of the mirror may result. FIG. 12 shows variations in the reflectivity and the mirror temperature of the reflecting mirror in FIG. 10 with respect to laser beam irradiation time, and from this figure it will be understood that the mirror reflectivity lowers about 50 seconds after irradiation with a laser beam.

In addition, breakdown of a reflecting mirror occurs also when nickel or copper coming out to the mirror surface is oxidized, and hence the beam absorptivity is further increased. In the case where a reflecting mirror is used for a long period of time under high-temperature conditions, gold on the surface of a gold coating layer may also become oxidized, thereby reducing the reflectivity.

Briefly stated, it is difficult to use the laser beam welding apparatus using the reflecting mirrors with the above-mentioned structure in continuous operation.

SUMMARY OF THE INVENTION

It is therefore one object of the present invention to provide a reflecting mirror for a high power laser beam which can be used for a long period under a high-temperature conditions even without water cooling.

Another object of the present invention is to provide a laser beam welding apparatus for an inner circumferential surface of a tube with which tube repair work can be improved.

In order to achieve the aforementioned objects, according to a first feature of the present invention, there is provided a reflecting mirror for a laser beam, consisting of a mirror base member and a high-reflectivity metal coating layer formed on the mirror base member for reflecting a laser beam, in which a coating layer having a small diffusion coefficient is provided on the back surface of the high-reflectivity metal coating layer.

According to a second feature of the present invention, there is provided the above-mentioned type of reflecting mirror for a laser beam, in which a dielectric layer or layers are provided on the surface of the high-reflectivity metal coating layer.

According to a third feature of the present invention, there is provided the above-mentioned type of reflecting mirror for a laser beam, in which a coating layer having a small diffusion coefficient is provided on the back surface of the high-reflectivity metal coating layer and a dielectric layer or layers are provided on the surface of the high-reflectivity metal coating layer.

According to a fourth feature of the present invention, there is provided a laser beam welding apparatus for an inner circumferential surface of a tube, which apparatus comprises a flexible tube through which an optical fiber for transmitting a laser beam is extended and whose front end is adapted to be inserted into a work tube, a position detector for detecting a relative position of the flexible tube with respect to the work tube, and an internally expansible type fixing means, for fixing the flexible tube within the work tube, provided at the front end portion of the flexible tube. A rotary cylinder is rotatably supported from the flexible tube, a guide support means is mounted to the rotary cylinder in a relatively rotatable manner and held in contact with the inner wall surface of the work tube for holding the a rotary cylinder concentrically with the work tube, rotary drive means is provided and has its output shaft disposed coaxially with the rotary cylinder for rotationally driving the rotary cylinder. An optical condensing system is disposed within the rotary cylinder for leading the welding laser beam emanating from the front end of the optical fiber to the inner wall surface of the work tube in a condensed state, a gas scavenging means is provided for discharging metal vapor produced during welding of the work tube, and a gas cooling means is provided for cooling the optical condensing system. In addition the above-featured laser beam reflecting mirror is employed as the reflecting mirror in the aforementioned optical condensing system.

In the first-featured laser beam reflecting mirror, due to the fact that a coating layer having a small diffusion coefficient such as tungsten is interposed between a high-reflectivity metal coating layer and a mirror base member or an lower metal coating layer such as a nickel coating layer, other metals will not diffuse into the high-reflectivity metal coating layer such that the reflectivity.

Also, in the second-featured laser beam reflecting mirror, as a result of forming a dielectric coating layer or layers of aluminium oxide ($Al_2O_3$), titanium oxide ($TiO_2$) and/or silica oxide ($SiO_2$) on a high-reflectivity metal coating layer, oxidation of the high-reflectivity metal coating layer can be prevented and also the reflectivity of the metal coating layer can be improved.

Since the third featured laser beam reflecting mirror incorporates both the first feature and the second feature of the present invention, the effect of this laser beam reflecting mirror is the joint effect of the effects presented by the first-featured and second-featured laser beam reflecting mirrors.

In the above-featured laser beam welding apparatus for an inner circumferential surface of a tube, the flexible tube inserted into a work tube is stopped at a predetermined working position located by the position detector, and the flexible tube is fixed with respect to the work tube by the fixing means. At this time, the rotary cylinder is held concentrically with the work tube by the guide support means, and, from this state, the welding laser beam is projected to the inner wall surface of the work tube via the optical condensing system. Simultaneously the rotary cylinder is rotated by the rotary drive means to make the welding laser beam circularly scan the inner wall surface of the work tube.

In addition, metal vapor produced during the welding work is removed by the gas scavenging means, also the optical condensing system is cooled by the cooling means. Thereby efficiency of the welding operation is improved.

Moreover, the laser beam reflecting mirror according to the present invention as featured above is employed as a laser beam reflecting mirror in the aforementioned optical condensing system. Therefore, welding can be performed for a long period of time while maintaining a good reflectivity for the laser beam over a long period.

Furthermore, even if a temperature increase caused by absorption of the laser beam should occur, lowering of the reflectivity of the reflecting mirror will not occur. Therefore break-down of the reflecting mirror can be prevented.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

In the following, the present invention will be described in greater detail in connection with preferred embodiments thereof with reference to the accompanying drawings.

Figure 1:
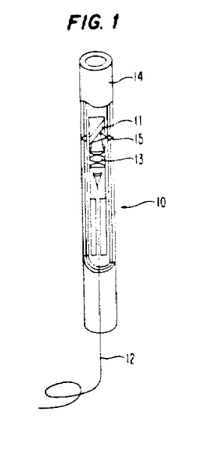
FIG. 1 is a schematic view of a laser beam irradiation device in a laser beam welding machine in which a reflecting mirror according to the present invention is employed.

FIG. 1 shows a laser beam emission device in a laser beam welding machine making use of a YAG laser as one example of a high power laser, and a reflecting mirror 11 according to the present invention is assembled in this laser beam emission device 10. The laser beam emission device 10 is connected to a YAG laser (not shown) via an optical fiber 12, and provision is made such that when a laser beam oscillated from the YAG laser propagates through the optical fiber 12 and enters the laser beam emission device 10, after it is converged by a condensor lens 13, its traveling path may be bent at a right angle by the reflecting mirror 11. In the illustrated embodiment, the laser beam is condensed on the inner circumferential surface of a tube 14, and so, by rotating the laser beam emission device 10 itself or the tube 14 by one revolution, the inner circumferential surface of the tube 14 can be circumferentially welded as indicated by reference numeral 15.

Figure 2:
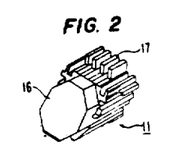
FIG. 2 is a perspective view of a reflecting mirror according to the present invention.

FIG. 2 is a perspective view of the reflecting mirror 11, and reference numeral 16 designates a mirror surface. As will be fully described in the following, since cooling of the reflecting mirror is almost unnecessary, it suffices to only provide air-cooling type radiation fins 17 as cooling means for the reflecting mirror 11.

Figure 3:
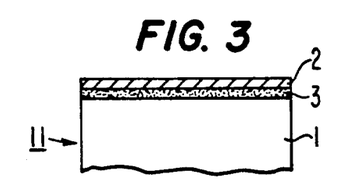
FIG. 3 is a cross section view of a reflecting mirror according to a first aspect of the present invention.

FIG. 3 is a cross-section view of a reflecting mirror embodying the first aspect of the present invention. In this reflecting mirror 11, a tungsten coating layer 3 of 2000–3000 Å in thickness is formed on a surface of a mirror base member 1 made of copper. Furthermore, on this tungsten coating layer 3 is provided a gold coating layer 2 of 5000 Å in thickness. These coating layers 3 and 2 are formed by vapor deposition, ion plating, or the like.

As tungsten has a small diffusion coefficient, if the tungsten coating layer 3 is present on the back surface side of the gold coating layer 2, the former layer serves as a diffusion-preventing layer between the gold coating layer 2 and the mirror base member 1, and so even if this reflecting mirror 11 is irradiated with a high power laser beam for a long time, mutual diffusion between gold and copper would be prevented. Molybdenum is known as another material having such diffusion-preventing capability.

Figure 7:
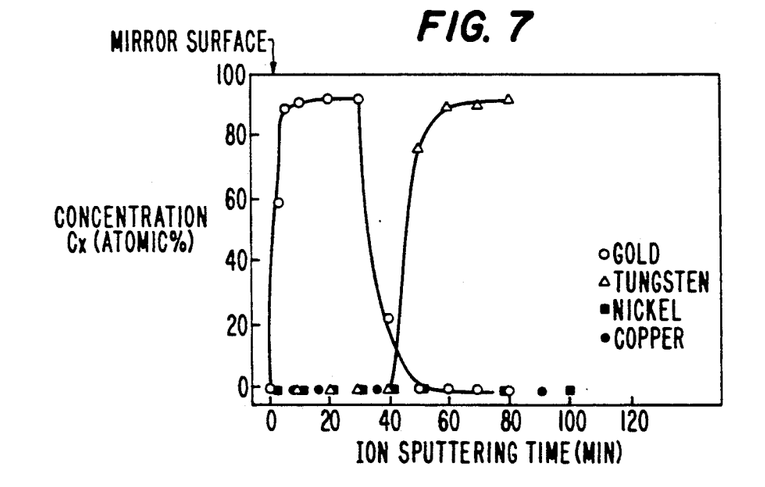
FIG. 7 is a diagram showing results of Auger analysis for a mirror coating portion after use of the reflecting mirror according to the first aspect of the present invention.

As a modification of the reflecting mirror 11 in FIG. 3, a reflecting mirror having a nickel coating layer formed between the tungsten layer 3 and the mirror base member 1 (not shown) can be conceived, and results of Auger analysis in the case where this reflecting mirror was irradiated for a long time with a high power laser beam without cooling, are shown in FIG. 7. Comparing these data with those shown in FIG. 11 in the case where the tungsten coating layer is not present, it is seen that diffusion of nickel or copper to the mirror surface is not present at all, hence oxidation of the nickel or copper, will not occur and a high reflectivity can be insured.

Figure 4:
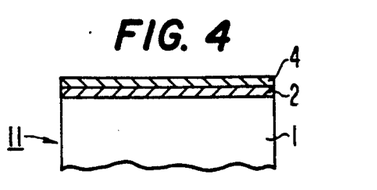
FIG. 4 is a cross-section view of a reflecting mirror according to a second aspect of the present invention.

FIG. 4 shows a reflecting mirror according to the second aspect of the present invention. In this reflecting mirror 11, a dielectric coating layer 4 consisting of aluminium oxide of $\lambda/4$ ($\lambda = 1.06$ μm) in thickness for beam incident angle is provided on a gold coating layer 2 of 5000 Å in thickness.

This dielectric coating layer 4 has a function of preventing oxidation of the gold coating layer 2. Also, the reflectivity of this reflecting mirror 11 is higher by about 2% than that of a reflecting mirror not provided with the dielectric coating layer 4, and the reflecting mirror can be used for a long period under high-temperature conditions without providing water-cooling.

Figure 5:
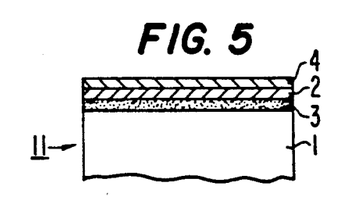
FIG. 5 is a cross-section view of a reflecting mirror according to a third aspect of the present invention.

FIG. 5 shows a reflecting mirror according to the third aspect of the present invention. As shown in FIG. 5, this reflecting mirror 11 has a structure in which a tungsten coating layer 3 of 2000-3000 Å in thickness is further formed between the mirror base member 1 and the gold coating layer 2 in the reflecting mirror shown in FIG. 3, and hence it presents the effects of both the first aspect and the second aspect of the present invention. That is, the tungsten coating layer 3 prevents mutual diffusion between the gold coating layer 2 and the mirror base member 1, and also the dielectric coating layer 4 prevent oxidation of the gold coating layer 2.

Figure 6:
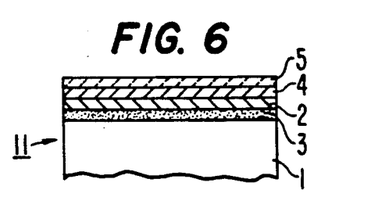
FIG. 6 is a cross-section view of a reflecting mirror also according to the third aspect of the present invention, but in which two layers of dielectric coating layers are provided.

It is to be noted that the dielectric coating layer formed on the gold coating layer 2 is not limited to a single layer, but two or more such layers could be provided as shown in FIG. 6. In the case of providing two such layers, a reflecting mirror in which silicon oxide or yttrium fluoride (YF$_3$) is used as the lower dielectric coating layer 4 and titanium oxide is used as the upper dielectric coating layer 5, can be conceived. In this preferred embodiment, the thickness of the respective coating layers is $\lambda/4$ for beam incident angle.

By forming the dielectric coating layer in multiple layers as described above, the reflectivity of the reflecting mirror 11 can be further improved as compared to that having a single coating layer.

Figure 8:
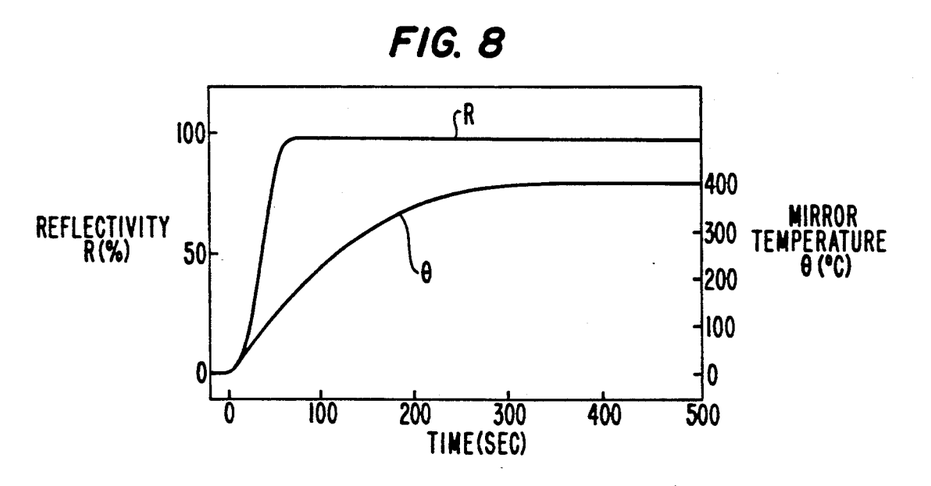
FIG. 8 is a diagram showing the relations between a laser beam irradiation time for the reflecting mirror according to the third aspect of the present invention and its reflectivity and mirror temperature.

FIG. 8 shows variations in a reflectivity R and a mirror temperature $\theta$ of a reflecting mirror 11 (FIG. 6) consisting of a mirror base member 1 made of copper, a tungsten coating layer 3, a gold coating layer 2, a dielectric coating layer 4 made of silicon oxide and a dielectric coating layer 5 made of titanium oxide, as a function of a YAG laser beam irradiation time. As shown in this figure, even when the laser irradiation was at a high power of 670 W and laser beam irradiation for was effected 500 seconds, the reflectivity of the reflecting mirror 11 was maintained at 98% or higher, and even when the mirror temperature rose to 400° C., the reflectivity was stable at 98%. In addition, during this measurement while the irradiation atmosphere was nitrogen atmosphere containing 2% oxygen, oxidation did not occur, and it is seen that the reflecting mirror 11 surely maintained a stable reflectivity. This effect will become more apparent by reference to FIG. 12.

It was confirmed that each of the each of above-described reflecting mirrors 11 can insure a high reflectivity of 97-99% over a long period at a high temperature of 300°-400° C., and a laser beam welding machine employing any of such reflecting mirrors 11 can achieve welding at a welding speed of 0.5 m/min. with a laser power of 800 W, continuously for 200 or more beads.

In the following, details of a laser beam welding apparatus for an inner circumferential surface of a tube embodying the present invention, will be explained.

Figure 13:
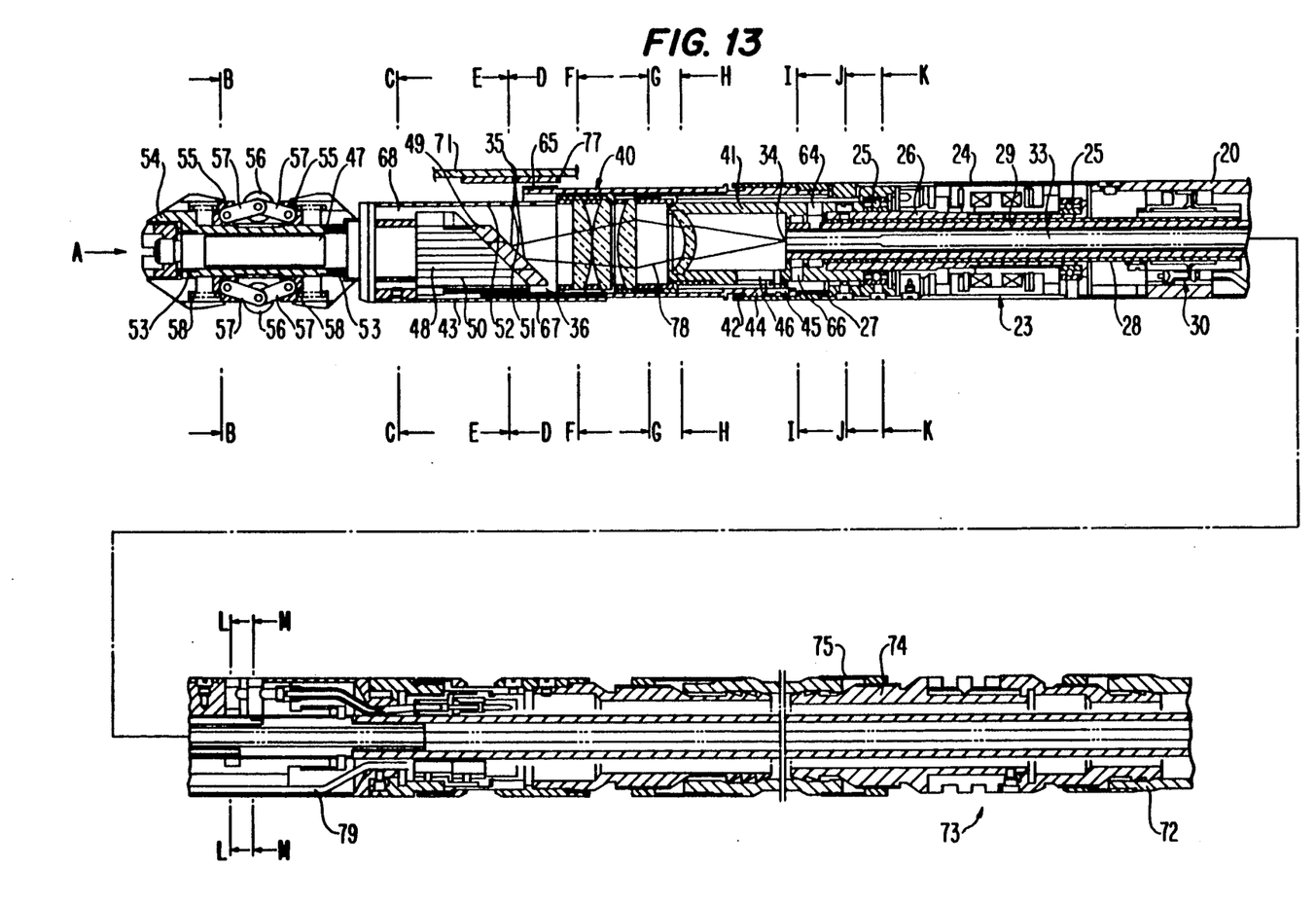
FIG. 13 is a longitudinal cross-section view of a laser beam welding apparatus for an inner circumferential surface of a tube according to the present invention.
Figure 14:
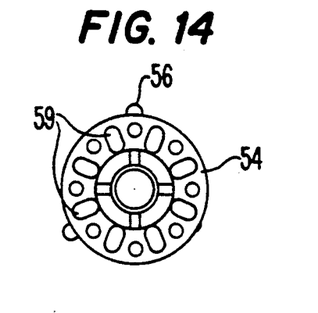
FIG. 14 is an end view of the same apparatus as viewed in the direction of an arrow A in FIG. 13.
Figure 27:
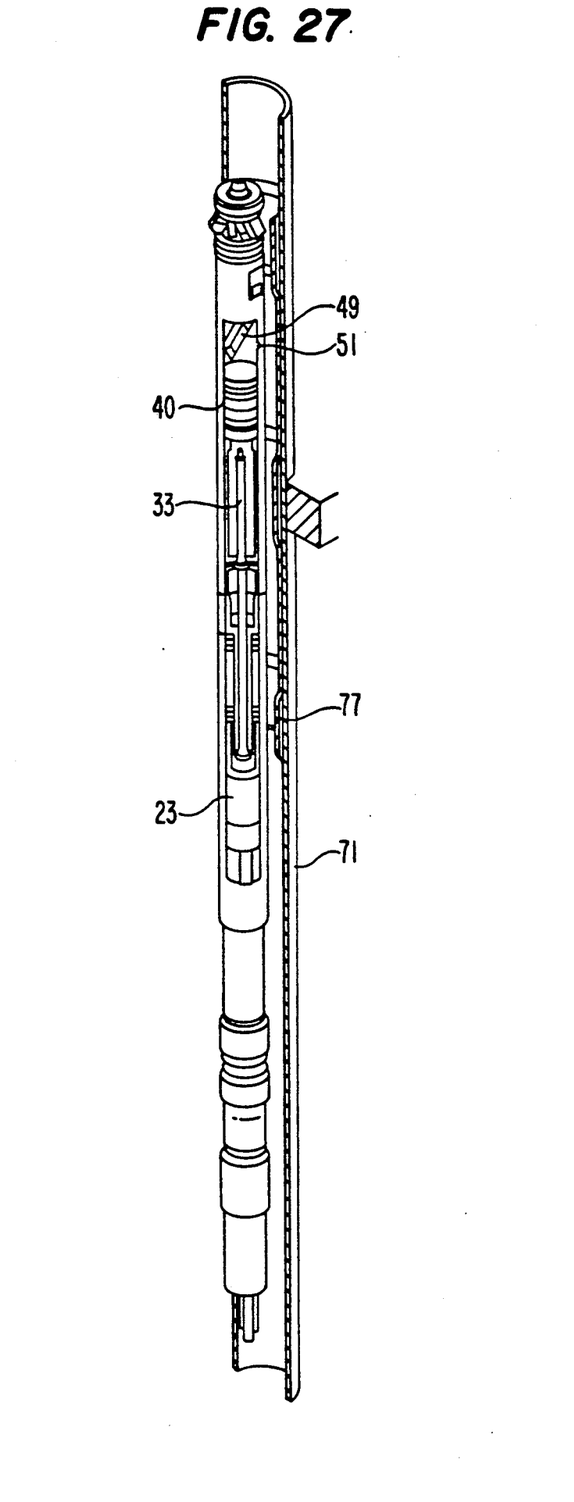
FIG. 27 is a schematic view showing a mounted state of the laser beam welding apparatus for an inner circumferential surface of a tube.

In the accompanying drawings, FIG. 13 is a longitudinal cross-section view of a laser beam welding apparatus for an inner circumferential surface of a tube according to one preferred embodiment of the present invention, FIG. 14 is an end view of the same laser beam welding apparatus as viewed in the direction of arrow A in FIG. 13, FIGS. 15 through 26 are transverse cross-section views of the same apparatus taken along lines B—B, C—C, D—D, E—E, F—F, G—G, H—H, I—I, J—J, K—K, L—L and M—M, respectively, of FIG. 13. FIG. 27 is a schematic view showing a mounted state of the laser beam welding apparatus for an inner circumferential surface of a tube.

As shown in FIG. 13, at the front end of a flexible tube 72 whose front end is adapted to be inserted into a heat transfer tube 71, a connecting cylinder 74 having an eddy current type position detector 73 in the illustrated embodiment, mounted on its outer circumferential surface is integrally fitted by means of a metal retainer 75. The above-mentioned position detector 73 is provided for the purpose of detecting a position of a header plate, a support plate, or a repair sleeve 77 which is inserted into and positioned in the heat transfer tube 71 so as to cover a damaged spot 35 and its proximity, and for the purpose of presetting an irradiation position of a welding laser beam 78, which will be described later, of a YAG laser or a carbon dioxide gas laser with respect to the heat transfer tube 71 or the repair sleeve 77. Position detector of other than the eddy current type can, of course, be employed.

To the front end of the above-mentioned connecting cylinder 74 an intermediate cylinder 20 is integrally secured by fitting. The intermediate cylinder 20 is covered with an air bag 79 which is formed of synthetic rubber. Such rubber has a high expansibility and has appropriate mechanical strength, such that the air bag serves as a fixing means. In this intermediate cylinder 20 is formed an air feed/exhaust hole (not shown) opening at the outer circumferential surface of the intermediate cylinder 20 for feeding compressed air to the space between the outer circumferential surface of the intermediate cylinder and the inner circumferential surface of the cylindrical air bag 79. To this air feed/exhaust hole is connected an air feed/exhaust system (not shown) which extends through the connecting cylinder 74 and the flexible tube 72, and when compressed air is fed into the air bag 79 through the air feed/exhaust hole by this air feed/exhaust system, the air bag 79 is caused to expand and come into tight contact with the inner wall surface of the heat transfer tube 71. In this manner, the air bag 79 adapted to fix the front end of this welding apparatus to the heat transfer tube 71. It is to be noted that in place of compressed air, any other gas or liquid can be employed, and it is also possible to employ other well-known internally expanding type of fixing means in lieu of the air bag 79 utilized in the illustrated embodiment. In addition, the sequence of connection of the connecting cylinder 74 and the intermediate cylinder 20 with respect to the flexible tube 72 can be reversed.

To the front end of the intermediate cylinder 20 a stationary cylinder 24 is integrally secured by fitting. The stationary cylinder 24 accommodate therein a drive motor 23 serving as a rotary drive means. Within this stationary cylinder 24, a rotary cylinder 26 is rotatably supported by means of a bearing 25. The rotary cylinder 26 operates as an output shaft of the drive motor 23. Also the front end portion of the rotary cylinder 26 a support cylinder 27 is integrally secured by fitting. It is to be noted that for this drive motor 23, a small-sized, low-speed and high-torque type motor such as a stepping motor or an ultrasonic motor can be utilized.

Figure 23:
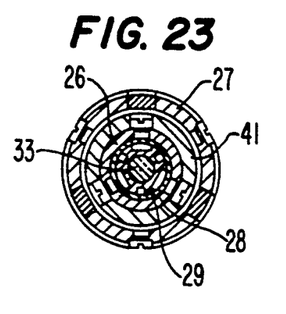
FIG. 23 is a transverse cross-section view of the same apparatus taken along line J—J in FIG. 13 as viewed in the direction of arrows.
Figure 24:
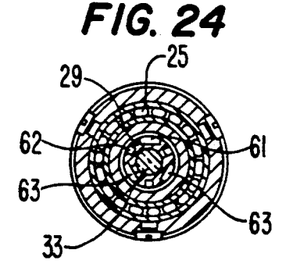
FIG. 24 is a transverse cross-section view of the same apparatus taken along line K—K in FIG. 13 as viewed in the direction of arrows.
Figure 25:
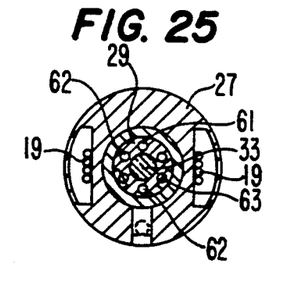
FIG. 25 is a transverse cross-section view of the same apparatus taken along line L—L in FIG. 13 as viewed in the direction of arrows.
Figure 26:
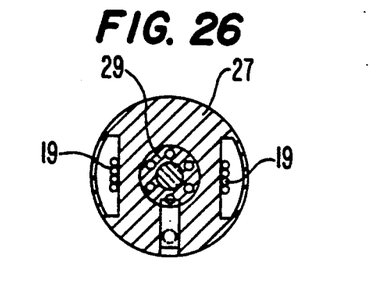
FIG. 26 is a transverse cross-section view of the same apparatus taken along line M—M in FIG. 13 as viewed in the direction of arrows.

On the inside of this rotary cylinder 24 is fixedly secured a fiber sheath 29 via a sleeve 28, in which gas passageways 61, 62 and 63 defining gas scavenging and cooling means, as will be described later, are formed in the longitudinal direction as shown in FIGS. 23 and 24. In addition, on the outside of the fiber sheath 29 and sleeve 28 and behind the drive motor 23 is provided a pulse encoder 30 for controlling an amount of rotation of the rotary cylinder 26, sleeve 28 and fiber sheath 29 with respect to the intermediate cylinder 20, stationary cylinder 24 and support cylinder 27. The pulse encoder 30 transmits a detection signal to a control means, such as a microcomputer (not shown) so as to control the drive motor 23.

A cable (not shown) connected to the drive motor 23 and pulse encoder 30, extends through the intermediate cylinder 20, connecting cylinder 74 and flexible tube 72 and is connected to a control unit. The control unit is connected, other than to the above-mentioned position detector 73 and gas feed/exhaust device, to a laser oscillator, to be described later and is adapted to generate control commands which are necessary for these devices.

On the inside of the fiber sheath 29 is inserted an optical fiber 33 which extends through the support cylinder 27, fixed cylinder 24, intermediate cylinder 20, connecting cylinder 74 and flexible tube 72 and is connected to a laser oscillator (not shown) to propagate a welding laser beam 78 emitted from the laser oscillator. At the central portion of the front end of this fiber sheath 29 is fixed a front end portion 34 of the optical fiber 33. In front of an emitting end surface (front end portion) 34 of this optical fiber 33, is disposed an optical condensing system 36 for converging the welding laser beam 78 emitted in a diverging state from the emitting end surface 34 of the optical fiber 33 towards the welding spot 35 on the repair sleeve 77 to be welded to the heat transfer tube 71.

The following description will be made assuming a situation in which the laser beam welding apparatus shown in FIG. 13 has been vertically inserted in a vertical portion of a heat transfer tube in a heat exchanger as shown in FIGS. 27 and 28. Therefore, it is to be noted that the term "vertical direction" as used in this description corresponds to "lateral directions", that is, "the front and rear directions" of the apparatus as viewed in FIG. 13.

Figure 17:
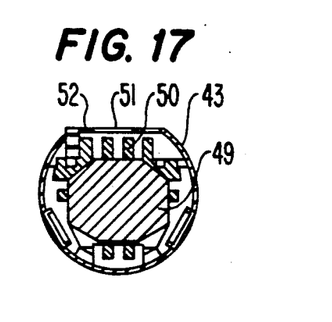
FIG. 17 is a transverse cross-section view of the same apparatus taken along line D—D in FIG. 13 as viewed in the direction of arrows.
Figure 18:
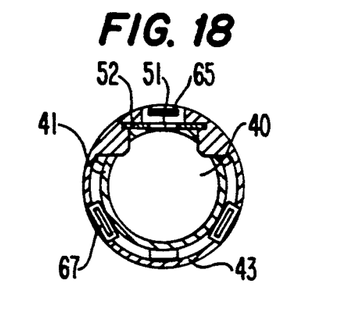
FIG. 18 is a transverse cross-section view of the same apparatus taken along line E—E in FIG. 13 as viewed in the direction of arrows.
Figure 19:
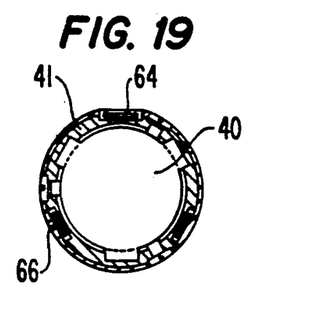
FIG. 19 is a transverse cross-section view of the same apparatus taken along line F—F in FIG. 13 as viewed in the direction of arrows.
Figure 20:
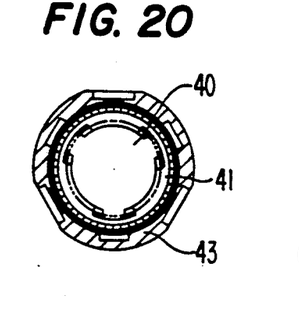
FIG. 20 is a transverse cross-section view of the same apparatus taken along line G—G in FIG. 13 as viewed in the direction of arrows.
Figure 21:
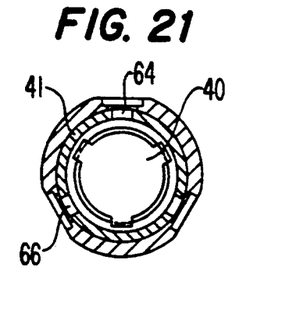
FIG. 21 is a transverse cross-section view of the same apparatus taken along line H—H in FIG. 13 as viewed in the direction of arrows.

Describing the optical condensing system 36 in more detail, to the upper portion of the rotary cylinder 26 is fixedly secured a cylindrical lens case 41, and within this lens case 41 are mounted a plurality of lenses 40 aligned in a vertical direction. Also, on the inner circumference of the upper portion of the support cylinder 27 are formed female screw threads. In addition, above the support cylinder 27 is positioned a mirror case 43, and on the outer circumference of the lower portion of this mirror case 43 are formed male screw threads which are engaged with the aforementioned female screw threads. To the side portion of the mirror case 43 is fixedly secured an engagement pin 45, while in the side portion of the lens case 41 is formed a slot 46 oriented in a vertical direction, and the engagement pin 45 is slidably fitted in the slot 46. To the upper portion of the mirror case 43 is fixed a support shaft 47, and at the lower surface of this support shaft 47 is mounted a reflecting mirror 49 via a pedestal 48. This reflecting mirror 49 serves to introduce a welding laser beam 78 to the welding spot 35 on the repair sleeve 77, and one of the laser beam reflecting mirrors, according to the present invention and illustrated in FIGS. 3 to 5, is chosen as this reflecting mirror 49. The reflecting mirror 49 is fixedly arranged at an angle of 45° with respect to the rotation axis of the rotary cylinder 26. As shown in FIG. 17, to the outer peripheral portion of the pedestal 48 are affixed fins 50 for radiating heat absorbed upon reflecting the laser beam 78. Also, at one side portion of the mirror case 43 is formed a beam hole 51 through which the laser beam 78 is allowed to pass, and a tungsten plate 52 having a melting point of about 3500° C. is fixedly secured to that side portion of the mirror case 43.

Accordingly, when the lens case 41 is rotated by the drive motor 23 via the rotary cylinder 26, the mirror case 43 is also rotated via the engagement pin 45. At the same time, the mirror case 43 is moved upwardly or downwardly with respect to the support cylinder 27 and the lens case 41 due to the threaded engagement between the support cylinder 27 and the mirror case 43, and so, welding effected while the reflecting mirror 49 is undergoes a spiral traveling motion.

Figure 15:
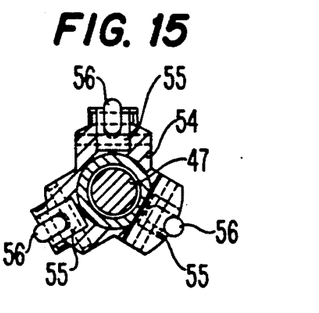
FIG. 15 is a transverse cross-section view of the same apparatus taken along line B—B in FIG. 13 as viewed in the direction of arrows.

At the top of the mirror case 43 is provided a guide support means for holding the rotary cylinder 26 concentrically with the heat transfer tube 71. As shown in FIGS. 13 and 15, at the upper portion of the above-described support shaft 47 is rotatably supported a roller supporting sleeve 54 via a bushing 53. Around this roller supporting sleeve 54 are slidably fitted a pair of annular sliders 55. To these sliders 55 are respectively pivotably attached, by way of pins, a pair of links 57 for rotatably supporting rollers 56 to be brought into contact with the inner wall surface of the heat transfer tube 71. These rollers 56 and links 57 are disposed as a plurality of sets (three sets in the illustrated embodiment) at equal angular intervals along the circumference of the roller supporting sleeve 54. In addition, between the opposite end portions of the roller supporting sleeve 54 and the respective sliders 55 are respectively interposed compression springs 58, and by the resilient forces of these compression springs 58 the rollers 56 are inherently pushed out towards the inner wall surface of the heat transfer tube 71 via the links 57, such that the rotary cylinder 26 is thereby held concentrically in the heat transfer tube 71. It is to be noted that as the guide support means, any means besides that used in this preferred embodiment, can be employed, so long as it can hold the rotary cylinder 26 concentrically in relation with the heat transfer tube 71. Also, at the top of the roller support sleeve 54 are formed a large number of gas exhaust holes 59 as shown in FIG. 14.

Figure 22:
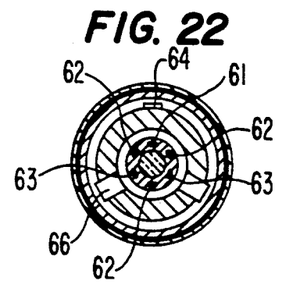
FIG. 22 is a transverse cross-section view of the same apparatus taken along line I—I in FIG. 13 as viewed in the direction of arrows.

Furthermore, in this laser beam welding apparatus for an inner circumferential surface of a tube are provided gas scavenging means for removing metal vapor produced upon welding of the repair sleeve 78 and cooling means for cooling the optical condensing system 36. As shown in FIG. 22, in the fiber sheath 29 are formed a gas passageway 61 for removing metal vapor produced upon welding, cooling gas passageways 62 for the lenses 40, and cooling gas passageways 63 for the reflecting mirror 49. And, the base end portions of these respective gas passageways are connected to corresponding gas feed sources (not shown).

As shown in FIG. 13 and FIGS. 18 to 22, the gas passageway 61 for discharging metal vapor communicates with a gas passageway 64 defined in the lens case 41, and further communicates with a jet nozzle 65 mounted at the top portion of this lens case 41. Accordingly, an inert gas such as He (helium), Ne (neon), $N_2$ (nitrogen) or the like can be ejected from this jet nozzle 65 through the beam hole 51 towards the reflecting mirror 49.

The cooling gas passageways 62 for the lenses 40 open in the vicinity of the emitting end surface 34 of the optical fiber 33 to cool the respective lenses 40. The cooling gas passageways 63 for the reflecting mirror 49 communicate with the gas passageway 66 defined in the lens case 41, and further communicate with a jet nozzle 67 mounted to the top portion of this lens case 41. Accordingly, the cooling gas is supplied from this jet nozzle 67 towards the fins 50 affixed to the pedestal 48 of the reflecting mirror 49, and thereby cools these fins.

Figure 16:
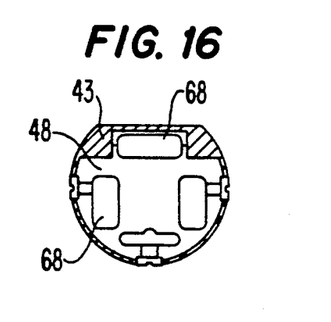
FIG. 16 is a transverse cross-section view of the same apparatus taken along line C—C in FIG. 13 as viewed in the direction of arrows.

It is to be noted that these various kinds of gases are exhausted to the outside through a gas exhausting hole 68 defined at the top of the mirror case, as shown in FIG. 16.

In the following, description will be made of the repair work for the heat transfer tube 71 with the repair sleeve 77 by making use of the laser beam welding apparatus constructed in the above-described manner, according to this preferred embodiment of the present invention.

As shown in FIG. 27, the laser beam welding apparatus is inserted from its front end portion into the heat transfer tube 71 in which the repair sleeve 77 has been preliminarily fitted, and a positioning operation is carried out by means of a position detector 73 so that the beam hole 51 and the welding spot 35 become alignated with one another. Thereafter, the intermediate cylinder 20 is fixed in the heat transfer tube 71 by feeding compressed air into the air bag 79. At this moment the rotary cylinder 26 is held concentrically in relation to the heat transfer tube 71 by the guide support means rollers 56.

Then, the drive motor 23 is actuated, to rotate the rotary cylinder 26 at the same time the welding laser beam 78 irradiates the welding spot 35, and thereby circumferential welding between the heat transfer tube 71 and the repair sleeve 77 is effected. More particularly, when the rotary cylinder 26 rotates, the lens case 41 also rotates and it rotates the mirror case 43 via the engagement pin 45. Then, due to the threaded engagement between the support cylinder 27 and the mirror case 43, the reflecting mirror 49 in the mirror case 43 moves upwardly by a distance corresponding to a stroke of the slot 46, which is in practice a distance of several milimeters, while it is rotating. In this manner a welding operation is carried out by the inner circumferential surface of the repair sleeve 77 while the reflecting mirror 49 is undergoing a spiral motion.

At this moment, an inert gas is introduced from a gas feed source to the gas passageway 61, then passes through the gas passageway 64 and is ejected from the jet nozzle 65 towards the optical condensing system 36, including the reflecting mirror 46 and the lenses 40. Thereby, metal vapor produced during welding is discharged.

In addition, a cooling gas is introduced from a gas feed source to the gas passageways 62 and 63, and is ejected in the neighborhood of the emitting end surface portion 34 of the optical fiber 33 to cool the respective lenses 40. At the same time, the cooling gas passes through the gas passageway 66 and is ejected from the jet nozzle 67 towards the fins 50 on the outer peripheral portion of the pedestal 48 to thereby cool the reflecting mirror 49.

Accordingly, the optical condensing system 36 can lead the welding laser beam 78 from the optical fiber 33 to the inner surface of the repair sleeve on the heat transfer tube 71 in an adequately condensed state.

It is to be noted that the respective ejected gases are discharged to the outside through the gas outlet hole 68 at the top of the mirror case 43.

Moreover, since the reflecting mirrors illustrated in FIGS. 3 to 5 and described above are employed as the reflecting mirror 49 in the optical condensing system 36, even if the welding operation by means of a laser beam is carried out for a long period, the reflectivity of the mirror 49 can be maintained high, and good welding can be achieved. In addition, even if the temperature of the mirror 49 becomes high as a result of absorption of the laser beam, its reflectivity will not be lowered, and also breakdown of the mirror 49 will not occur.

As described in detail above, in the laser beam reflecting mirror according to the first aspect of the present invention, since a coating layer having a small diffusion coefficient such as a layer of tungsten, molybdenum or the like is provided on the back surface of a high-reflectivity metal coating layer such as a gold layer, mutual diffusion between the high-reflectivity metal coating laser and the mirror base member (a base metal coating layer, such as a nickel coating layer or the like) can be prevented. Thereby the mirror reflectivity can be maintained, and increase of the mirror temperature can be prevented.

Also, in the laser beam reflecting mirror according to the second aspect of the present invention, due to the dielectric coating layer on the high-reflectivity metal coating layer, oxidation of the high-reflectivity metal coating layer can be prevented, and simultaneously the reflectivity is also improved. Hence, in this case also, increase of the mirror temperature can be prevented.

In the laser beam reflecting mirror according to the third aspect of the present invention, since the reflecting mirror includes both the dielectric coating layer and the anti-diffusion coating layer, effects and advantages more than those expected from the first or second aspect of the present invention can be provided.

Accordingly, any one of the reflecting mirrors according to the first, second or third aspects, respectively, of the present invention can be used for a long period under high-temperature conditions even without the provision of water-cooling. In addition, since large-scale cooling means, such as a water-cooling mechanism is unnecessary, it is possible to make the apparatus more compact.

In the laser beam welding apparatus for an inner circumferential surface of a tube according to the present invention, since a laser beam is employed for lap welding of the inner circumferences of the work tube and the repair sleeve, and also since there are provided gas scavenging means and cooling means for the optical condensing system for condensing the laser beam, good lap welding is possible regardless of the materials of the work tube and the repair sleeve. Also the positioning operation necessary for spot welding and the setting operation for the repair sleeve can be greatly simplified. Furthermore, since gas scavenging and cooling for the optical condensing system can be achieved during a welding operation, a good condensed condition of the laser beam can always be maintained.

In addition, since one of the above-described laser beam reflecting mirrors according to the first, second or third aspects of the present invention is employed as the laser beam reflecting mirror in the optical condensing system, even if welding with the laser beam is carried out for a long period of time the reflectivity can be maintained high and good welding can be achieved. Furthermore even if the temperature of the laser beam reflecting mirror increases due to absorption of the laser beam, the reflectivity will not decrease. Therefore, breakdown of the mirror can be prevented.

While a principle of the present invention has been described above in connection with preferred embodiments of the invention, it is intended that all matter contained in the above description and illustrated in the accompanying drawings shall be interpreted to be illustrative and not as a limitation to the scope of the invention.

What is claimed is:

1. A laser beam welding apparatus comprising: a flexible tube having an optical fiber extended therethrough for transmitting a welding laser beam, said flexible tube being insertable into a work tube; a position detector for detecting a relative position of said flexible tube with respect to said work tube; fixing means for fixing said flexible tube within said work tube, said fixing means comprising an expansible member provided at the front end portion of said flexible tube; a rotary cylinder rotatably supported from said flexible tube; guide support means rotatably mounted to said rotary cylinder such that said guide support means can be held in contact with the inner wall surface of said work tube for holding said rotary cylinder concentrically with said work tube; rotary drive means having its output shaft disposed coaxially with said rotary cylinder for rotatably driving said rotary cylinder; an optical condensing system disposed within said rotary cylinder for leading the welding laser beam emanating from the front end of said optical fiber to the inner wall surface of said work tube in a condensed state; gas scavenging means for discharging metal vapor produced during welding of said work tube; gas cooling means for cooling said optical condensing system; and wherein said optical condensing system includes a reflecting mirror comprising a mirror base member, a high-reflectivity metal coating layer formed on the mirror base member for reflecting a laser beam, and a coating layer having a small diffusion coefficient provided on the back surface of said high-reflectivity metal coating layer.

2. A laser beam welding apparatus comprising: a flexible tube having an optical fiber extended therethrough for transmitting a welding laser beam, said flexible tube being insertable into a work tube; a position detector for detecting a relative position of said flexible tube with respect to said work tube; fixing means for fixing said flexible tube within said work tube, said fixing means comprising an expansible member provided at the front end portion of said flexible tube; a rotary cylinder rotatably supported from said flexible tube; guide support means rotatably mounted to said rotary cylinder such that said guide support means can be held in contact with the inner wall surface of said work tube for holding said rotary cylinder concentrically with said work tube; rotary drive means having its output shaft disposed coaxially with said rotary cylinder for rotatably driving said rotary cylinder; an optical condensing system disposed within said rotary cylinder for leading said welding laser beam emanating from the front end of said optical fiber to the inner wall surface of said work tube in a condensed state; gas scavenging means for discharging metal vapor produced during welding of said work tube; gas cooling means for cooling said optical condensing system; and wherein said optical condensing system includes a reflecting mirror comprising a mirror base member, a high-reflectivity metal coating layer formed on the mirror base member for reflecting a laser beam, and at least one dielectric coating layer provided on the surface of said high-reflectivity metal coating layer.

3. A laser beam welding apparatus comprising: a flexible tube having an optical fiber extended therethrough for transmitting a welding a laser beam, said flexible tube being insertable into a work tube; a position detector for detecting a relative position of said flexible tube with respect to said work tube; fixing means for fixing said flexible tube within said work tube, said fixing means comprising an expansible member provided at the front end portion of said flexible tube; a rotary cylinder rotatably supported from said flexible tube; guide support means rotatably mounted to said rotary cylinder such that said guide support means can be held in contact with the inner wall surface of said work tube for holding said rotary cylinder concentrically with said work tube; rotary drive means having its output shaft disposed coaxially with said rotary cylinder for rotatably driving said rotary cylinder; an optical condensing system disposed within said rotary cylinder for leading said welding laser beam emanating from the front end of said optical fiber to the inner wall surface of said work tube in a condensed state; gas scavenging means for discharging metal vapor produced during welding of said work tube; gas cooling means for cooling said optical condensing system; and wherein said optical condensing system includes a reflecting mirror comprising a mirror base member, a high-reflectivity metal coating layer formed on the mirror base member for reflecting a laser beam, a coating layer having a small diffusion coefficient provided on the back surface of said high-reflectivity metal coating layer, and at least one dielectric coating layer provided on the surface of said high-reflectivity metal coating layer.

4. A reflecting mirror for a welding laser beam, comprising: a base member formed of a metal of high thermal conductivity;

a diffusion barrier layer, formed of a metal of high melting point, mounted on a surface of said base member; and a high-reflectivity metal layer, mounted on a surface of said diffusion barrier layer opposite said base member, for reflecting the welding laser beam.

5. A reflecting mirror as recited in claim 4, wherein said base member is formed of copper or copper alloy.

6. A reflecting mirror as recited in claim 5, wherein said diffusion barrier layer is formed of tungsten.

7. A reflecting mirror as recited in claim 6, wherein said high-reflectivity metal layer is formed of gold.

8. A reflecting mirror as recited in claim 7, further comprising
a plurality of heat radiating fins mounted on said base member.

9. A reflecting mirror as recited in claim 5, wherein said diffusion barrier layer is formed of molybdenum.

10. A reflecting mirror as recited in claim 9, wherein said high-reflectivity metal layer is formed of gold.

11. A reflecting mirror as recited in claim 10, further comprising
a plurality of heat radiating fins mounted on said base member.

12. A reflecting mirror as recited in claim 4, wherein said diffusion barrier layer is formed of tungsten.

13. A reflecting mirror as recited in claim 12, wherein said high-reflectivity metal layer is formed of gold.

14. A reflecting mirror as recited in claim 13, further comprising
a plurality of heat radiating fins mounted on said base member.

15. A reflecting mirror as recited in claim 4, wherein said diffusion barrier layer is formed of molybdenum.

16. A reflecting mirror as recited in claim 15, wherein said high-reflectivity metal layer is formed of gold.

17. A reflecting mirror as recited in claim 16, further comprising
a plurality of heat radiating fins mounted on said base member.

18. A reflecting mirror as recited in claim 4, further comprising
a plurality of heat radiating fins mounted on said base member.

* * * * *

UNITED STATES PATENT AND TRADEMARK OFFICE
CERTIFICATE OF CORRECTION

PATENT NO. : 5,097,110

DATED : April 29, 1992

INVENTOR(S) : Shoichi HAMADA et al.

It is certified that error appears in the above-identified patent and that said Letters Patent is hereby corrected as shown below:

In the drawings, sheet 1 of 8, Figures 3-8 should be replaced by Figures 1 and 2 as shown below:

FIG. 1

UNITED STATES PATENT AND TRADEMARK OFFICE
CERTIFICATE OF CORRECTION

Page 2 of 2

PATENT NO. : 5,097,110
DATED : April 29, 1992
INVENTOR(S) : Shoichi Hamada, et. al.

It is certified that error appears in the above-indentified patent and that said Letters Patent is hereby corrected as shown below:

FIG. 2

Signed and Sealed this

Fifteenth Day of June, 1993

Attest:

MICHAEL K. KIRK

Attesting Officer

Acting Commissioner of Patents and Trademarks